US012563087B2

(12) United States Patent
Jenkinson et al.

(10) Patent No.: US 12,563,087 B2
(45) Date of Patent: *Feb. 24, 2026

(54) ENDPOINT AGENT AND SYSTEM

(71) Applicant: Darktrace Holdings Limited, Cambridge (GB)

(72) Inventors: Thomas Jenkinson, Ashford (GB); David Sansom, Cambridge (GB); Maximilian Heinemeyer, Lower Saxony (DE); Jack Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,720

(22) Filed: Oct. 14, 2022

(65) Prior Publication Data

US 2023/0080471 A1 Mar. 16, 2023

Related U.S. Application Data

(63) Continuation of application No. 16/279,039, filed on Feb. 19, 2019, now Pat. No. 11,477,219.

(Continued)

(51) Int. Cl.
*H04L 9/40* (2022.01)
*G06F 18/232* (2023.01)
(Continued)

(52) U.S. Cl.
CPC ........ *H04L 63/1441* (2013.01); *G06F 18/232* (2023.01); *G06F 21/554* (2013.01);
(Continued)

(58) Field of Classification Search
CPC . H04L 63/1441; H04L 63/14; H04L 63/1416; H04L 63/1425; G06F 21/554; G06N 20/00
See application file for complete search history.

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

(Continued)

*Primary Examiner* — Robert B Leung
(74) *Attorney, Agent, or Firm* — Rutan and Tucker, LLP

(57) ABSTRACT

The endpoint agent detects a cyber threat on an end-point computing device. The endpoint agent on the computing device has a communications module that communicates with a cyber defense appliance. A collections module monitors and collects pattern of life data on processes executing on the end-point computing-device and users of the end-point computing-device. The communications module sends the pattern of life data to the cyber defense appliance installed on a network. The cyber defense appliance at least contains one or more machine-learning models to analyze the pattern of life data for each endpoint agent connected to that cyber defense appliance. The endpoint agent and the cyber defense appliance may trigger one or more actions to be autonomously taken to contain a detected cyber threat when a cyber-threat risk score is indicative of a likelihood of a cyber-threat is equal to or above an actionable threshold.

19 Claims, 7 Drawing Sheets

Related U.S. Application Data

(60) Provisional application No. 62/632,623, filed on Feb. 20, 2018.

(51) Int. Cl.
| | |
|---|---|
| *G06F 21/55* | (2013.01) |
| *H04L 43/045* | (2022.01) |
| *H04L 51/224* | (2022.01) |

(52) U.S. Cl.
CPC .......... *G06F 21/556* (2013.01); *H04L 43/045* (2013.01); *H04L 63/14* (2013.01); *H04L 63/1416* (2013.01); *H04L 63/1425* (2013.01); *H04L 63/1433* (2013.01); *H04L 51/224* (2022.05); *H04L 63/20* (2013.01)

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 8,312,540 | B1 | 11/2012 | Kahn et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,401,925 | B1 | 7/2016 | Guo et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmueli et al. |
| 9,727,723 | B1 | 8/2017 | Kondaveeti et al. |
| 10,341,391 | B1 * | 7/2019 | Pandey ................... H04L 67/14 |
| 2002/0186698 | A1 | 12/2002 | Ceniza |
| 2003/0070003 | A1 | 4/2003 | Chong et al. |
| 2003/0131143 | A1 * | 7/2003 | Myers ..................... G06F 9/542 |
| | | | 719/318 |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2007/0118909 | A1 | 5/2007 | Hertzog et al. |
| 2007/0294187 | A1 | 12/2007 | Scherrer |
| 2008/0005137 | A1 | 1/2008 | Surendran et al. |
| 2008/0109730 | A1 | 5/2008 | Coffman et al. |
| 2009/0106174 | A1 | 4/2009 | Battisha et al. |
| 2009/0254971 | A1 | 10/2009 | Herz et al. |
| 2010/0009357 | A1 | 1/2010 | Nevins et al. |
| 2010/0095374 | A1 | 4/2010 | Gillum et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0151582 | A1 | 6/2012 | Reasor et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |

| | | | |
|---|---|---|---|
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0215618 | A1 | 7/2014 | Amit |
| 2014/0325643 | A1 | 10/2014 | Bart et al. |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0285858 | A1 | 9/2016 | Li et al. |
| 2016/0352768 | A1 | 12/2016 | Lefebvre et al. |
| 2016/0373476 | A1 | 12/2016 | Dell'Anno et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0099310 | A1 * | 4/2017 | Di Pietro ............ H04L 63/1425 |
| 2017/0169360 | A1 | 6/2017 | Veeramachaneni et al. |
| 2017/0220801 | A1 | 8/2017 | Stockdale et al. |
| 2017/0230391 | A1 | 8/2017 | Ferguson et al. |
| 2017/0230392 | A1 | 8/2017 | Stockdale |
| 2017/0251012 | A1 | 8/2017 | Stockdale et al. |
| 2017/0270422 | A1 | 9/2017 | Sorakado |
| 2018/0018456 | A1 * | 1/2018 | Chen ..................... G06F 21/552 |
| 2018/0027006 | A1 | 1/2018 | Zimmermann et al. |
| 2018/0167402 | A1 | 6/2018 | Scheidler et al. |
| 2018/0176260 | A1 * | 6/2018 | Palumbo ............. H04L 63/1425 |
| 2018/0183680 | A1 | 6/2018 | Chen et al. |
| 2018/0255076 | A1 | 9/2018 | Paine |
| 2018/0332053 | A1 * | 11/2018 | Weis ...................... H04L 63/20 |
| 2018/0332054 | A1 | 11/2018 | Ford |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

Non-Final Office Action for U.S. Appl. No. 16/279,039 mailed Jun. 18, 2021, 22 pages.

Final Office Action for U.S. Appl. No. 16/279,039 mailed Jan. 24, 2022, 17 pages.

* cited by examiner

200
cyber security
appliance

100A
end-point agent on an
end-point computing device

100B
end-point agent on
an end-point
computing device

100C
end-point agent on
an end-point
computing device

100D
end-point agent on an
end-point computing device

Network

ENDPOINT AGENT AND SYSTEM

NOTICE OF COPYRIGHT

RELATED APPLICATION

This application claims the benefit of priority under 35 USC 120 from U.S. patent application Ser. No. 16/279,039 titled "ENDPOINT AGENT AND SYSTEM," filed Feb. 19, 2019, which claimed priority to and the benefit of 35 USC 119 of U.S. provisional patent application titled "A cyber threat defense system with various improvements," filed Feb. 20, 2018, Ser. No. 62/632,623, which are incorporated herein by reference in their entirety.

FIELD

Embodiments of the design provided herein generally relate to a cyber threat defense system.

BACKGROUND

A system that delivers real-time threat detection and autonomous response with definitive network and/or end-point evidence that enables rapid threat investigation and remediation is needed. A system that gives the ability to deploy instances of a host agent in computing devices to extend the system's powerful threat detection and response across the network is needed. Where it is not possible to deploy a new endpoint host agent, a universal communication method is needed to utilize existing third-party logging and endpoint tools on an end-point computing device.

SUMMARY

In an embodiment, an endpoint agent can have one or more modules. The endpoint agent detects a cyber threat on an end-point computing-device.

The endpoint agent resident on the end-point computing-device has a communications module configured to communicate with an Application Programming Interface (API) hosted by a cyber security appliance. The endpoint agent has a collections module configured to monitor and collect pattern of life data of multiple software processes executing on the end-point computing-device and one or more users of the end-point computing-device. The communications module and the collections module cooperate to send the pattern of life data, via the communications module, to the cyber security appliance installed on a network. The network can be i) an informational technology network, ii) an operational technology network, iii) a cloud infrastructure, iv) a SaaS infrastructure, and v) any combination of these four, connected to the end-point computing-device. The cyber security appliance at least contains one or more machine-learning models to analyze the pattern of life data for each endpoint agent connected to an API hosted by the cyber security appliance.

These and other features of the design provided herein can be better understood with reference to the drawings, description, and claims, all of which form the disclosure of this patent application.

BRIEF DESCRIPTION OF THE DRAWINGS

The multiple drawings refer to the embodiments of the invention.

Figure 1:
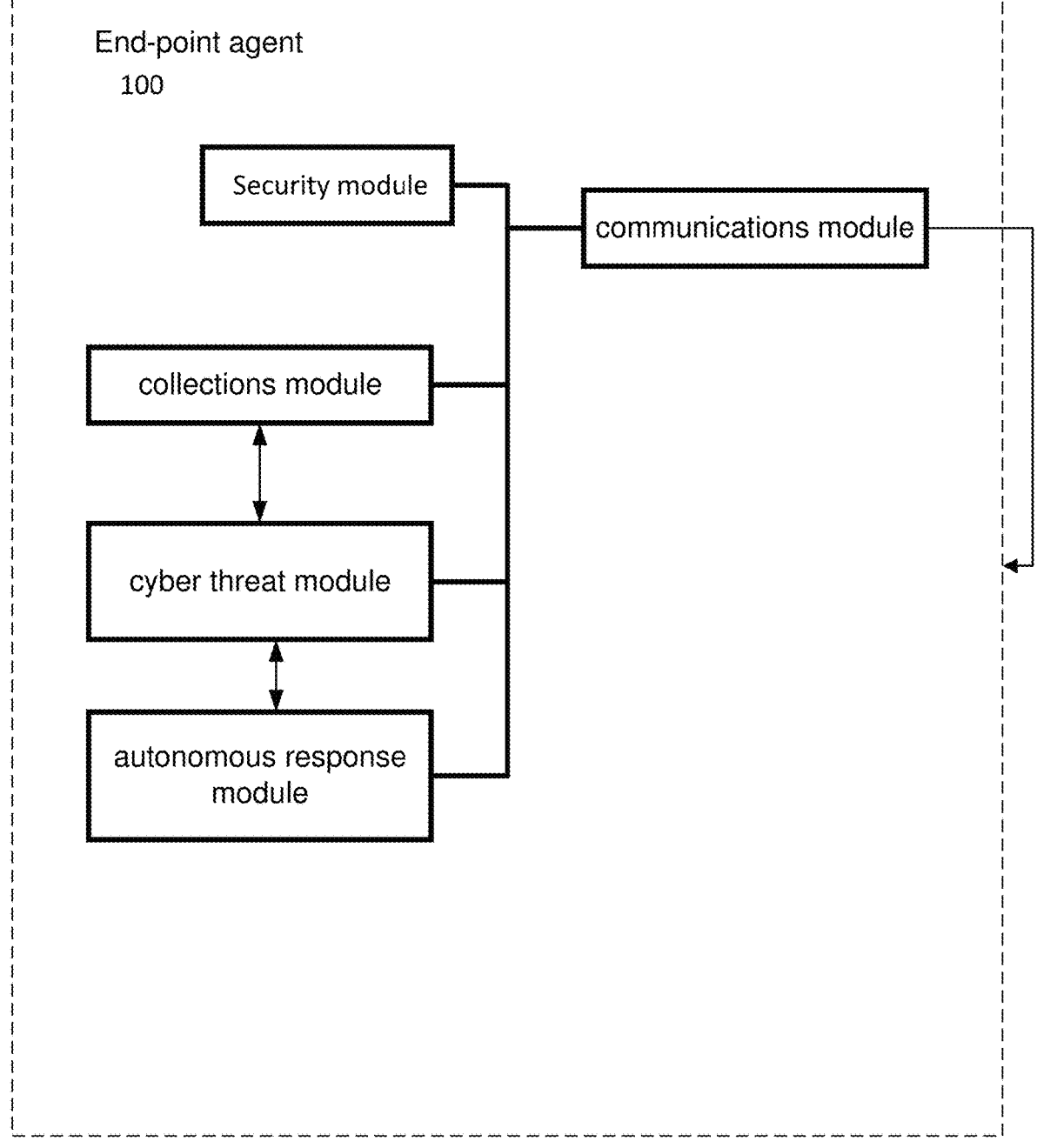
FIG. 1 illustrates a block diagram of an embodiment of an endpoint agent configured to cooperate with a cyber security appliance to detect a cyber threat on an end-point computing device.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber security appliance may use artificial intelligence to analyze cyber security threats. The endpoint agent collaborates with a cyber defense appliance to detect a cyber threat on an end-point computing-device. The end-point agent on the computing-device has a communications module that communicates with a cyber defense appliance. A collections module monitors and collects pattern of life data on each software process executing on the end-point computing-device and users of the end-point computing-device. The communications module sends the pattern of life data to the cyber defense appliance installed on a network. The cyber defense appliance at least contains one or more machine-learning models to analyze the pattern of life data for each endpoint agent connected to that cyber defense appliance. Based upon an analysis of this pattern of life data, the cyber defense appliance may trigger one or more actions to be autonomously taken through the end-point agent to contain a detected cyber threat when a cyber-threat risk score is indicative of a likelihood of a cyber-threat is equal to or above an actionable threshold.

FIG. 1 illustrates a block diagram of an embodiment of an endpoint agent configured to cooperate with a cyber security appliance to detect a cyber threat on an end-point computing device. The end-point computing-device can be a mobile phone, a tablet, a laptop, a desktop, Internet of Things appliance, etc. The endpoint agent 100 can be resident on the computing-device.

An endpoint agent 100 on an end-point computing-device can have multiple modules that are configured to cooperate with each other. The modules can include example modules that include a communications module, a Security module, a collections module, a cyber threat module, an autonomous response module, a User Interface and Display module on the cyber defense appliance displaying data and metrics regarding the local end-point computing-device hosting the endpoint agent, and a unifying translator module hosted upon the cyber defense appliance.

The communications module can securely communicate with an API hosted by a cyber defense appliance. The collections module in the endpoint agent 100 can monitor and collect pattern of life data of multiple software processes executing on the endpoint computing-device as well as one or more users of the endpoint computing-device. The communications module and the collections module cooperate to periodically send the pattern of life data via the communications module to the cyber defense appliance installed on a network connected to the end-point computing-device. The collections module can collect pattern of life data that includes metadata, events, and alerts regarding at least i) the users, ii) the multiple software processes, iii) relationships between the software processes executing on the computing-device, iv) device operation, and v) operating system configuration changes, and then is sent by the communications module to the cyber defense appliance installed in the network.

The cyber defense appliance at least contains one or more machine-learning models to analyze the pattern of life data for each endpoint agent 100 connected to an API hosted by the cyber defense appliance. The cyber defense appliance can use one or more machine-learning models trained on the end-point computing-device to analyze i) the collected pattern of life data for the endpoint agent 100 connected to that API hosted by the cyber defense appliance against ii) a normal pattern of life for the end-point computing-device. The cyber defense appliance also is configured to use a cyber threat module that references one or more machine-learning models trained on potential cyber threats to analyze for potential cyber threats on the end-point computing-device in light of the collected pattern of life data that deviates from the normal pattern of life for that end-point computing-device. The cyber threat module can be located i) within the cyber defense appliance 200, or ii) a portion located within the endpoint agent 100 with limited functionality to respond to set of conditions and threats and then another portion with full functionality located within the cyber defense appliance 200. The cyber threat module located within the endpoint agent 100 on the computing device can identify certain conditions and cause a trigger while not connected to the network where the cyber defense appliance is installed in.

The communications module will send collected pattern of life data to the cyber defense appliance 200, and then the cyber defense appliance 200 is configured to initially match a type of computing device and operating system that this particular end-point computing-device falls into in order to apply and route the collected pattern of life data to a corresponding set of the one or more machine-learning models trained on the end-point computing-device. Thus, the cyber defense appliance 200 applies, initially, a corresponding set of models based on a category of computing-device as well as an operating system used by that the particular end-point computing-device.

The cyber defense appliance 200 uses the enhanced set of machine-learning models trained on a normal pattern of life of i) the network, ii) each computing-device being monitored by the endpoint agent 100 resident on the computing-device, and iii) the interactions of each computing-device monitored by the endpoint agent within the wider network (such as SaaS platforms, Cloud platforms etc.) to form a distributed pattern of life.

The enriched view uses the normal pattern of life based on that specific host-based data as well as data from similar types of hosts, such a same category of computing-devices using that same operating system, such as mac OS. The pattern of life of a smart phone or a tablet using mac OS will behave in its normal pattern of life much differently than a smart phone or a tablet using another operating system, such as Linux or Windows. This like with like comparison between i) operating systems, ii) device types, iii) peers and iv) other clusters means spotting host-based anomaly metrics with the models can have a narrower band of parameters that indicate i) what is the normal pattern of life and ii) deviant behaviors that are true anomalies.

In an embodiment, the endpoint agent 100 can be scripted to:
  i) have a low system impact on the end-point computing-device and runs without degrading endpoint computing-device performance significantly;
  ii) monitor "pattern of life" of the end-point computing-device, its processes, such as Outlook, Word, etc., its users, events on that device, etc.
  This at least includes:
  process behavior (use of network, filesystem, etc.),
  relationships between processes (parent/child, shared files, IPC), and
  user behavior (applications commonly used, IT habits);

iii) make reports on pattern of life metadata, events and alerts to an API whenever connected to the internet or LAN, and while offline, cache data to deliver when possible;

iv) assist in performing IT audits while also completing pattern of life data and events (the following list is illustrative and should not be considered exhaustive):

audit system details, for example installed Operating Systems, installed software, software versioning, security update status, gather system usage activity such as shutdown periods, login failures, file modifications, network connections, etc., record use of external devices or transfer protocols (for example, USB usage, Bluetooth usage, email usage), v) autonomously react to anomalies in pattern of life:

cooperate with the cyber defense appliance 200 with its significantly greater processing power, sets of models including, for example, pulling when available, any actions to be taken and/or be able to take a limited set of actions when a connection to the cyber defense appliance 200 is not available;

provide an operator with the ability to enable the end point agent to perform a select number of relatively simple actions when predefined conditions of suspicious behavior and/or anomaly level are met, independent of the cyber defense appliance; and example actions may include; prompt user, quarantine a suspicious process (from network access and process as well as internal computing device's process and filesystem), shutdown the offending processes, and others.

The autonomous response module, rather than a human taking an action, is configured to cause one or more actions to be taken to contain a detected cyber threat when a cyber-threat risk score is indicative of a likelihood of a cyber-threat that is equal to or above an actionable threshold. The cyber threat module has algorithms that can factor in confidence in correctly identifying the existence of the cyber threat, severity of the cyber threat posed that includes the type of cyber threat and the files/area of sensitivity being compromised, in order to generate the cyber-threat risk score. The cyber-threat risk score factors the analysis of the potential cyber threats on the end-point computing-device in light of the collected pattern of life data that deviates from the normal pattern of life for that end-point computing-device. Portions of the autonomous response module can be located in either in the endpoint agent 100 and in the cyber defense appliance 200.

Figure 5:
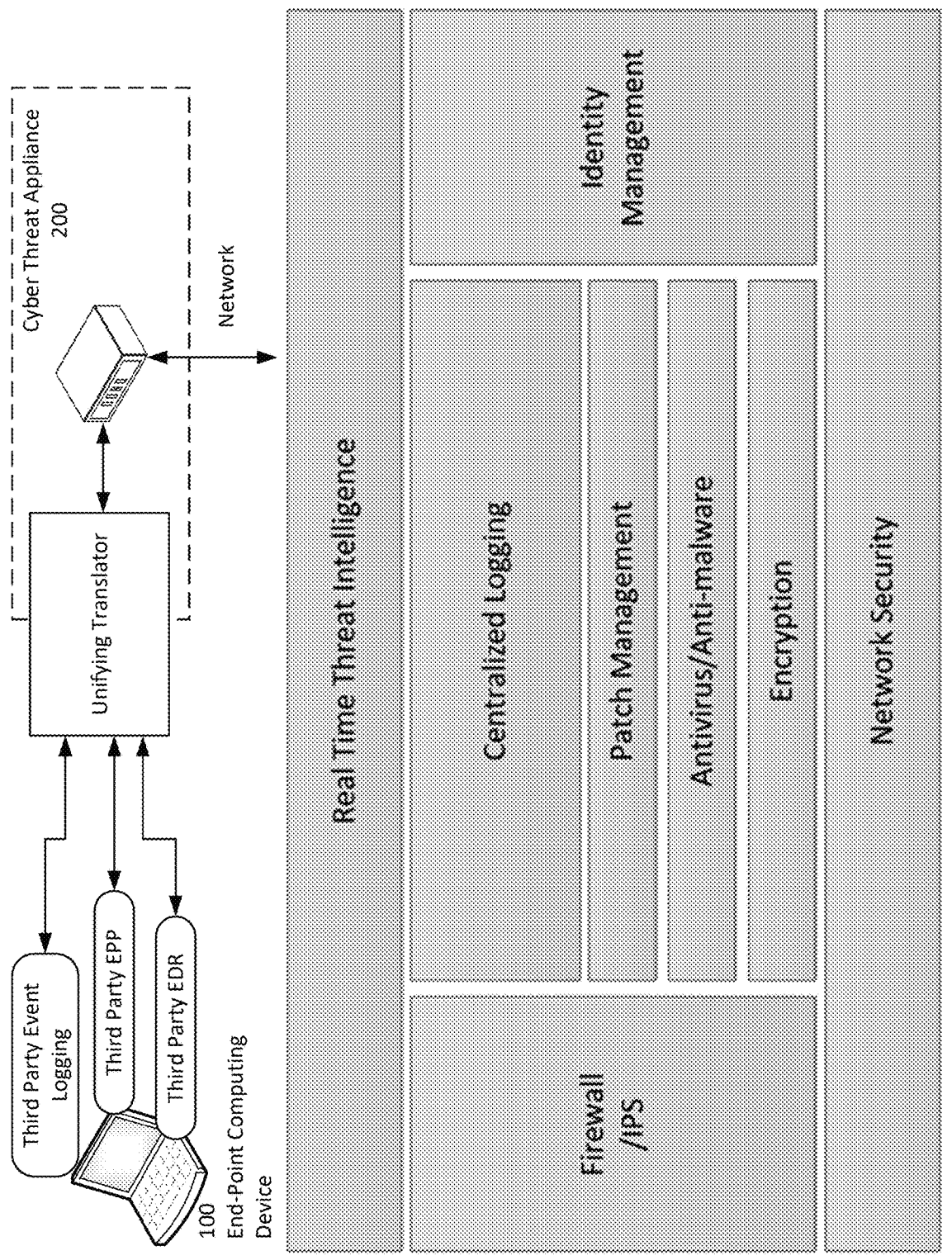
FIG. 5 illustrates a block diagram of an embodiment of a unifying translator configured to understand and be able to exchange communications with other endpoint security processes on the end-point computing-device via having a set of connector Application Programming Interfaces to map conveyed information from a plurality of different known endpoint security processes.

A human user, via a programmable user interface, can preapprove one or more actions to autonomously take in order to attempt to contain a malicious threat. The preapproved autonomous actions can be set in the user interface based on both an identified cyber threat and a threat score. Different threat scores can have different preapproved autonomous actions.

Where the end-point computing device already possesses a third-party endpoint agent, the cyber defense appliance can adapt the third-party endpoint to supply similar pattern of life data and take a limited range of actions. The cyber defense appliance 200 can include a unifying Endpoint Detection and Response process (EDR)/Endpoint Protection Platform (EPP) translator configured to understand and be able to exchange communications with other endpoint security processes on the endpoint computing-device. The unifying EDR/EPP translator has a set of connector Application Programming Interfaces (APIs) to map conveyed information from a plurality of different known endpoint security processes including one of more EDRs, EPPs, and any combination of both EDRs and EPPs. (See e.g. FIG. 5). FIG. 5 illustrates a block diagram of an embodiment of a unifying translator of a cyber threat appliance 200 configured to understand and be able to exchange communications with other endpoint security processes on the end-point computing-device via having a set of connector Application Programming Interfaces to map conveyed information from a plurality of different known endpoint security processes.

An example set of connector APIs in the unifying EDR/EPP translator to communicate with other security processes can include default operating system logging solutions such as Windows Event Forwarding, Sysmon, any popular EDRs or EPPs such as Antivirus/malware applications.

Note, the EDR processes can be endpoint security tools that can both detect and respond to cyber exploits as well as provide a wealth of data including alerting, and forensic analysis. An EPP can be an integrated security solution designed to detect and block threats at device level. Typically this includes antivirus processes with known signature-based detection, anti-malware processes with known signature-based detection, data encryption processes, personal firewalls, intrusion prevention (IPS) processes and data loss prevention (DLP) processes.

Note, the set of connector APIs for the unifying EDR translator can structurally reduce the number of APIs by mapping conveyed information from a plurality of different known EDRs & EPPs to a central tier of APIs, which further condenses the amount of separate conversions to be able to take in EDR information as well as from popular EPPs.

The cyber defense appliance can employ existing security processes, EDRs and/or EPPs from other vendors running on the end-point computing device to function as versions of the end point agent 100. The cyber threat defense appliance achieves interoperability with other security processes on the host device with the set of connector APIs to tap into the diverse capabilities of multiple EDRs and/or EPPs. The translator connector APIs request relevant details from the one or more existing third-party agents on the end-point computing device to feed back through the unifying translator and into the cyber threat appliance as pattern of life data. Note, although the cyber threat appliance is able to utilize existing third party endpoint agents and logging solutions to gather end-computing device pattern of life data, this data is often incomplete or requires interaction with multiple different agents as the third-party agents are merely utilized rather than designed for this purpose of collecting pattern of life data. The unifying translator allows the cyber threat appliance to utilize third party agents where installing the endpoint agent 100 is not feasible, but this is not a preferable or as data-rich solution.

Note, any instructions of the modules are scripted to be stored in an executable format in one or more memories and by one or more processors of the endpoint computing-device.

Figure 2:
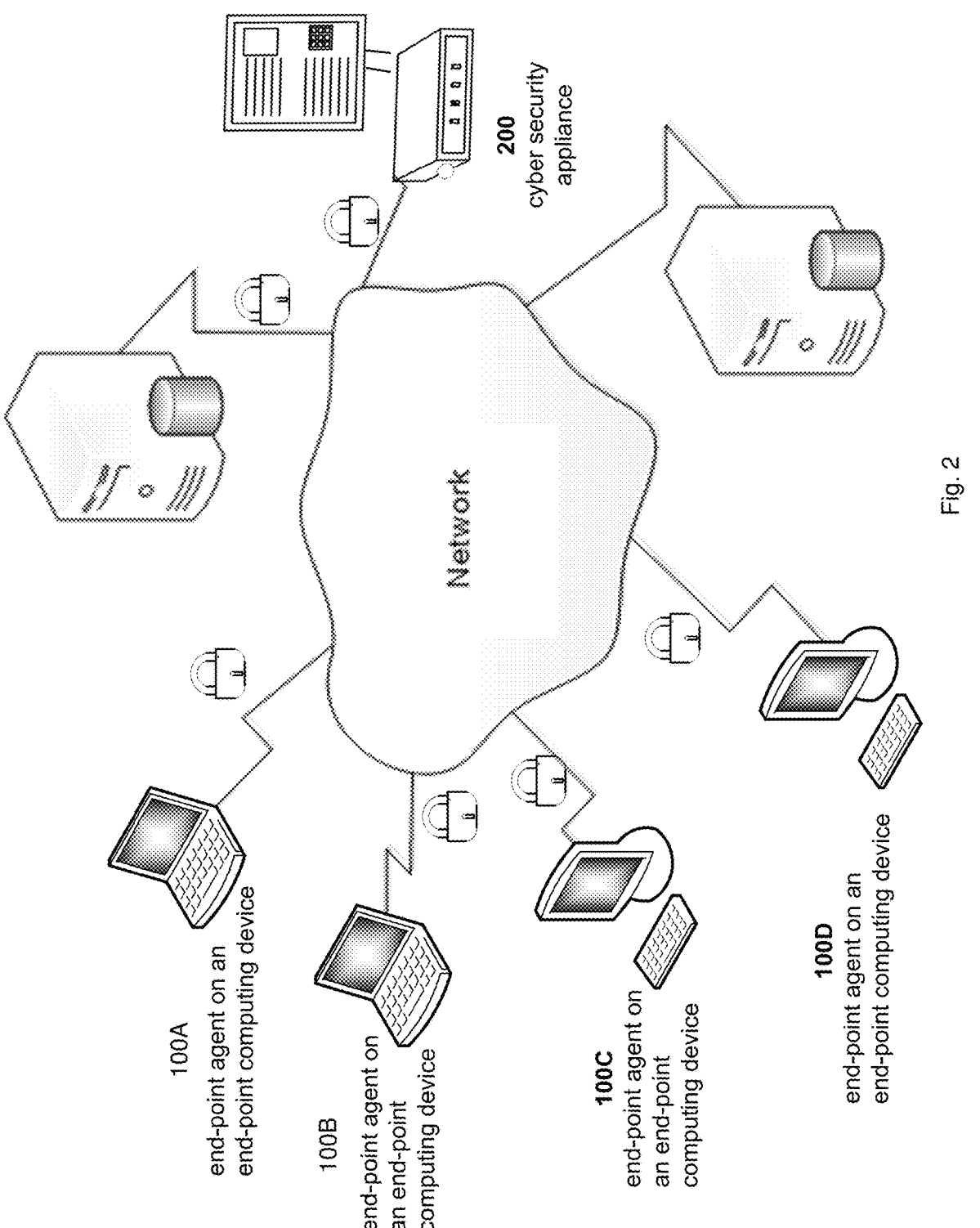
FIG. 2 illustrates a block diagram of an embodiment of a cyber security appliance cooperating with various endpoint agents connected to a network.

FIG. 2 illustrates a block diagram of an embodiment of a cyber security appliance cooperating with various endpoint agents connected to a network. The example network can be i) an informational technology network, ii) an operational technology network, iii) a cloud infrastructure, iv) a SaaS infrastructure, and v) any combination of these four, connected to each of the end-point computing-devices. The cyber security appliance 200 connected to the network receives collected pattern of life data from two or more endpoint agents 100A-100D. Each of the two or more endpoint agents 100A-10D is on their own endpoint computing-device in the network.

The collections module of each endpoint agent 100A-100D cooperates with two or more probes that include at least i) a first type of probes specifically configured to collect data from an operating system of the endpoint computing device as well as ii) a second type of probes specifically configured to collect data from each individual process executing on the endpoint computing device and iii) a third type of probe configured to collect system event and logging data from the endpoint computing device.

The collections module cooperates with one or more the third type of probe to monitor and record events occurring on the endpoint computing device. The collected data from the operating system and individual processes along with the recorded events are sent in the collected pattern of life data by the collections module to the cyber security appliance 200.

The collections module's framework runs probes in communication with the modules and data store. The first type of probes can monitor the operating system to gather profiling pattern of life data about the System state. This information can include, for example, installed applications, software versions, operating system and pending security updates.

The second type of probes can monitor individual processes themselves to gather process Pattern of Life data such as, but not limited to, associations between parent and child processes, network connectivity and process interaction, file system interaction.

The third type of probe may detect and record events and collaborate with default system event logging tools. The probe may gather events such as, for example, connections to new Wi-Fi or wired networks, interaction with peripheral devices (including, but not limited to, Universal Serial Bus, Visual Displays, etc.) and system usage events such as power management, file modification, etc.

The network module and the endpoint agent coordinator module of the cyber security appliance analyzes metrics from these entities (network entities including servers, networking gateways, routers, each endpoint agent connected to the network) using one or more models. The models can be a self-learning model trained on a normal behavior of each of these entities. The self-learning model of normal behavior is then continuously updated with actual behavior of that entity. The self-learning model of normal behavior is updated when new input data is received that is deemed within the limits of normal behavior. The modules can compare the analyzed metrics received from the probes and hooks to a moving benchmark of parameters that correspond to the normal pattern of life for the computing system used by the self-learning model (See e.g. FIG. 6).

The cyber threat module can then determine, in accordance with the analyzed metrics and the moving benchmark used by the self-learning model of normal behavior of the entity, a cyber-threat risk score indicative of a likelihood of a cyber-threat and its severity.

Note, a normal behavior threshold is used by the models as a moving benchmark of parameters that correspond to a normal pattern of life for the entities. The normal behavior threshold is varied according to the updated changes in the computer system allowing the model to spot behavior on the computing system that falls outside the parameters set by the moving benchmark.

Again, the endpoint agent 100 has an autonomous response module that causes one or more autonomous actions to be taken to contain the cyber threat when detected and i) when the endpoint agent 100 is not connected to the network where the cyber security appliance is installed, ii) when the cyber security appliance 200 is unavailable to communicate with the endpoint agent, and iii) any combination of i) and Hi. The autonomous response module located in the endpoint agent 100 can take one or more actions preapproved by a human user when predefined conditions of suspicious behavior and/or anomaly level are met, independent of the cyber defense appliance to autonomously attempt to contain the potential cyber threat.

Again, the autonomous response module, rather than a human taking an action, is configured to cause one or more autonomous actions to be taken to contain the cyber threat when a potential cyber threat is detected. i) the cyber security appliance can have the autonomous response module, or ii) a portion of the autonomous response module can exist on the endpoint agent 100 while the majority remains on the cyber security appliance due to greater processing power. A user programmable interface hosted on the cyber security appliance having any of i) fields, ii) menus, and iii) icons is scripted to allow a user to preauthorize the autonomous response module to take actions to contain the cyber threat. The user programmable fields/menus to allow a user to preauthorize the module to take actions such as killing individual processes, revoking specific privileges, preventing the download of specific files, allowing only processes observed in the pattern of life for peer devices to be active for a set period, asking other EPPs to quarantine suspicious files, etc. while not disturbing operations of other processes going on inside that device. The user interface has the granularity in options available to the user to program the autonomous response module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Example autonomous actions available to be pre-approved by a human user for the autonomous response module can include a general prompt to the user on the display screen of the end-point computing-device along with the action of:

Prevent or slow down activity related to the threat;

Quarantine or semi-quarantine people, processes, devices;

Feed threat intelligence to EPP and EDR processes and devices to take third party or vendor specific actions such as quarantine or firewall blocks; and . . . in most cases without disrupting the normal day to day activity of users or other processes on the end-point computing-device.

Again, the communications module sends collected pattern of life data to the cyber security appliance at periodic intervals when connected to the network where the cyber security appliance is installed. The communications module sends collected pattern of life data to one or more memories of the end-point computing-device i) when not connected to the network where the cyber security appliance 200 is installed as well as ii) when the cyber security appliance 200 is unavailable; and then in either situation, delivers the collected pattern of life data when possible.

Figure 6:
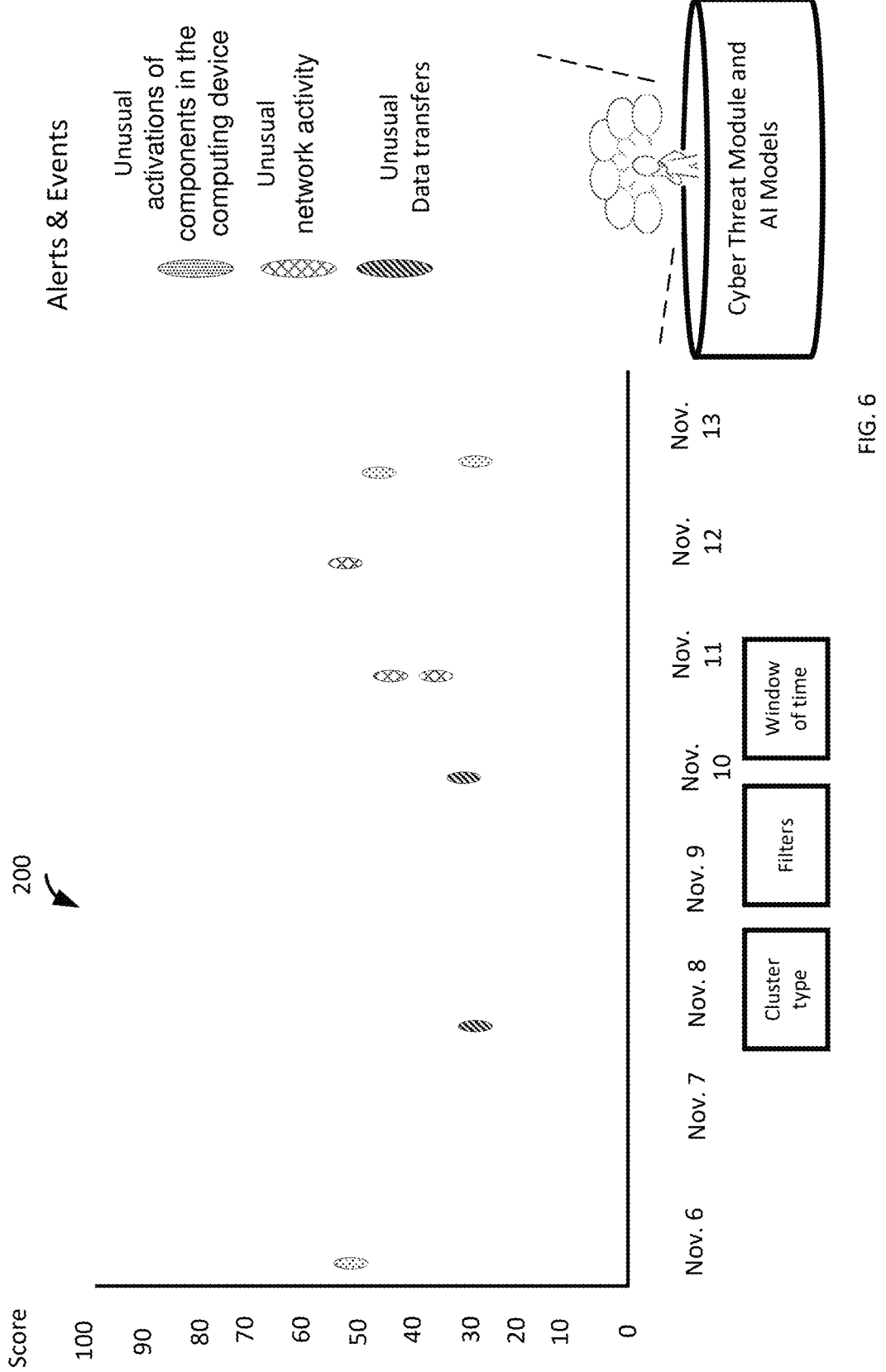
FIG. 6 illustrates a block diagram of an embodiment of one or more machine-learning models trained on the end-point computing-device to analyze the collected pattern of life data from an endpoint agent connected to that cyber security appliance against a normal pattern of life for the end-point computing-device.

FIG. 6 illustrates a block diagram of an embodiment of one or more machine-learning models trained on the endpoint computing-device to analyze the collected pattern of life data from an endpoint agent connected to that cyber security appliance 200 against a normal pattern of life for the end-point computing-device.

Figure 3:
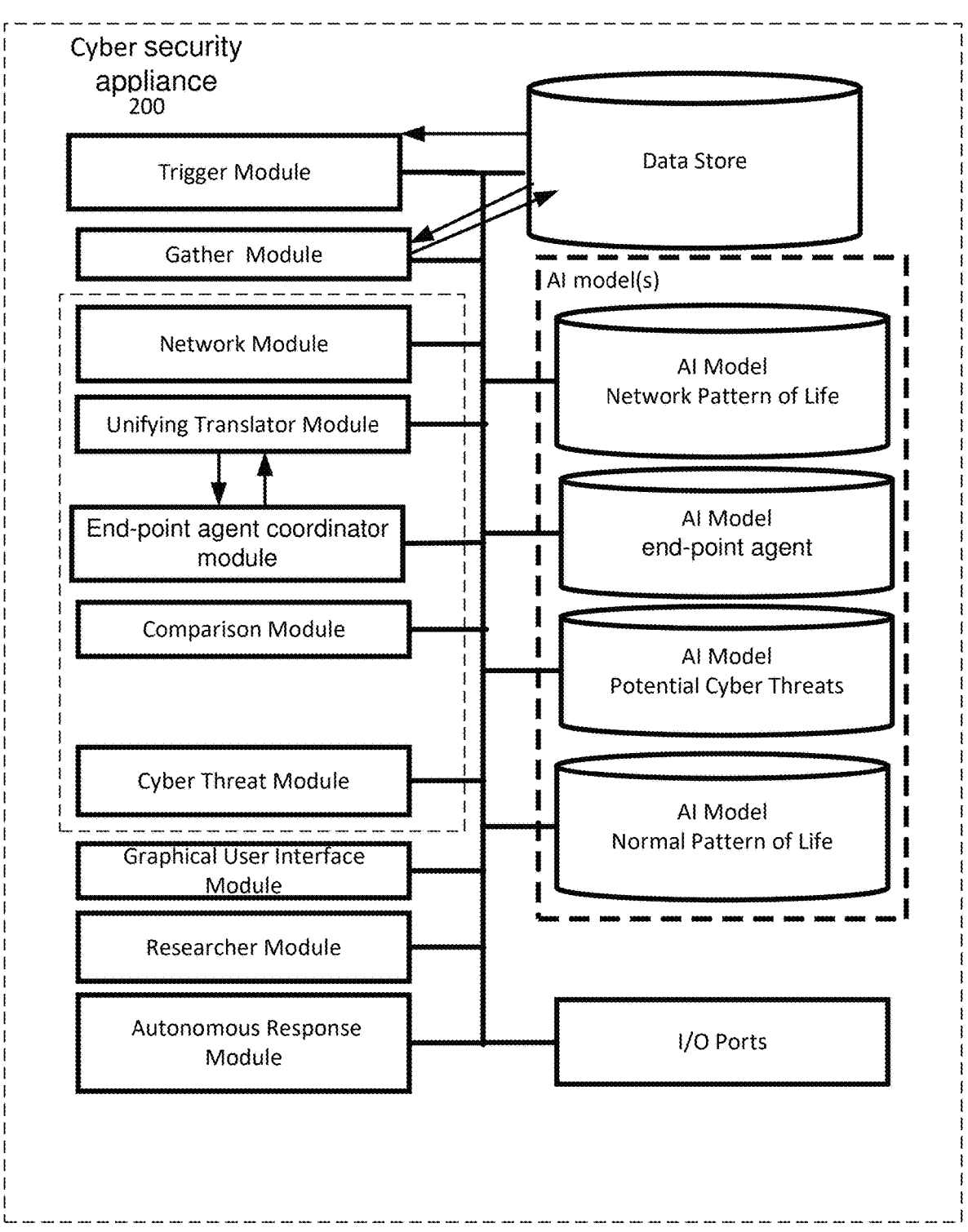
FIG. 3 illustrates a block diagram of an embodiment of a cyber security appliance with various modules that reference machine learning models that are trained on the normal pattern of life of entities to detect a cyber threat.

FIG. 3 illustrates a block diagram of an embodiment of a cyber security appliance with various modules that reference machine learning models that are trained on the normal pattern of life of entities to detect a cyber threat. The cyber security appliance 200 cooperating with multiple instances of the endpoint agent 100 may protect against cyber security threats from maliciously harming networks as well as from maliciously harming all of the end-point computing-devices connecting to that network where the cyber security appliance 200 is installed.

The cyber security appliance 200 may include components such as i) a trigger module, ii) a gather module, iii) a data store, iv) a graphical user interface module, v) a network module, vi) an endpoint agent coordinator module, vii) a coordinator module, vii) a comparison module, ix) a cyber threat module, x) a researcher module, xi) an autonomous response module, xii) at least one input or output (I/O) port to securely connect to other network ports as required, xiii) one or more machine learning models such as a first set of Artificial Intelligence models trained different aspects of the network including users, devices, system activities and interactions between entities in the system, and other aspects of the system, a second set of Artificial Intelligence models trained on pattern of life of host/end-point computing-device hosting an instance of the endpoint agent 100 including i) the users, ii) the multiple software processes, iii) relationships between the software processes, iv) device operation, v) operating system configuration changes, and vi) other such aspects, a third set of Artificial Intelligence models trained potential cyber threats, and additional Artificial Intelligence models, each trained on different types of computing-device and operating systems for each type of particular computing-device, and other aspects of the system, as well as xiv) other similar components in the cyber security appliance 200. The one or more modules utilize probes to interact with entities in the network.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of anomalies such as i) an abnormal behavior, ii) a suspicious activity, and iii) any combination of both. The inline data may be gathered on the deployment from a data store when the traffic is observed. The scope and wide variation of data available in the data store results in good quality data for analysis. The collected data is passed to the various modules as well as to the data store.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation occurs between the gather module and the various modules including the network module, the endpoint agent coordinator module, the coordinator module, the comparison module, and the cyber threat module, and the researcher module.

In addition, coordination occurs between the above modules and the one or more models trained on different aspects of this process. The cyber threat module can cooperate with the network module and an endpoint agent coordinator module to identify cyber threats based on comparisons by the comparison module. Each hypothesis of typical cyber threats can have various supporting points of data and other metrics associated with that possible threat, such as a human user insider attack, inappropriate network behavior, inappropriate behavior in a particular endpoint computing device, etc. A machine-learning algorithm will look at the relevant points of data to support or refute that particular hypothesis of what the suspicious activity or abnormal behavior related for each hypothesis on what the suspicious activity or abnormal behavior relates to.

Networks have a wealth of data and metrics that may be collected. The gatherer modules may then filter or condense the mass of data down into the important or salient features of data. In an embodiment, the various modules can be combined or kept as separate modules.

The network module can receive data on the network from the set of probes. Each endpoint agent 100 communicates and exchanges information with the cyber security appliance 200. The network module can reference various machine learning models. The endpoint agent coordinator module can reference one or more machine learning models, using machine learning and Artificial Intelligence algorithms, that are trained on a normal pattern of life of end-point computing-device with a resident endpoint agent 100. The network module can also reference one or more machine learning models, using machine learning and AI algorithms, that are trained on a normal pattern of life of the network.

A comparator module can compare the received data on the network and/or the endpoint agents 100 to the normal pattern of life for these individual entities and in the wider network context in order to detect anomalies and then a cyber threat.

Note, once the normal pattern of life has been learned by the models, then the network module, endpoint agent coordinator module and/or comparator module can readily identify the anomalies in the normal pattern of life; and thus, unusual behaviors from the devices, users, or other aspects of the network and its associated host/end-point computing-devices.

Note, once the normal pattern of life has been learned by the models, then the modules can readily identify the anomalies in the normal pattern of life; and thus, unusual behaviors from the devices, users, or processes of the network.

A coordinator module can analyze and integrate both activities occurring in the network as well as activities occurring internally within each end-point computing-device at the same time when analyzing the detected anomalies in the normal pattern of life in order to detect the cyber threat. Each endpoint agent 100 provides pattern of life data to the cyber defense appliance so it may derive pattern of life for each end-point computing-device.

The graphical user interface can display metrics, alerts, and events of both the network in light of activities occurring in endpoint computing device on a common display screen. The graphical user interface allows a viewer to visually contextualize the metrics, alerts, and/or events occurring in the network in light of the activities occurring in the endpoint computing-devices on the common display screen.

The graphical user interface also allows a viewer to then to confirm the detected cyber threat in view of what is happening in the network as well as in the endpoint computing devices.

A cyber threat module can compare a chain of one or more of the detected anomalies by referencing one or more machine learning models trained on, at least, the cyber threat. Multiple machine learning models may be trained, each model trained on a category of cyber threats and its corresponding members or each model trained on its own specific cyber threat. The cyber threat module cooperates and communicates with the other modules.

The cyber security appliance 200 may supplement the data provided to the users and cyber professionals using a researcher module. The researcher module can use one or more artificial intelligence algorithms to assess whether the anomalous activity has previously appeared in other published threat research or known lists of malicious files or Internet addresses. The researcher module can consult internal threat databases or external public sources of threat data. The researcher module can collect an outside data set describing at least one of an action or a state related to the cyber threat present outside of the network from at least one data source outside the network.

The cyber security appliance 200 can then take actions in response to counter detected potential cyber threats. The autonomous response module, rather than a human taking an action, can be configured to cause one or more rapid autonomous actions in response to be taken to counter the cyber threat.

The user interface for the response module can program the autonomous response module i) to merely make a suggested response to take to counter the cyber threat that will be presented a display screen and/or sent by a notice to an administrator for explicit authorization when the cyber threat is detected or ii) to autonomously take a response to counter the cyber threat without a need for a human to approve the response when the cyber threat is detected. The autonomous response module will then send a notice of the autonomous response as well as display the autonomous response taken on the display screen.

The cyber threat module can cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The cyber security appliance 200 may be hosted on a computing device, on one or more servers, or in its own cyber threat appliance platform.

Figure 4:
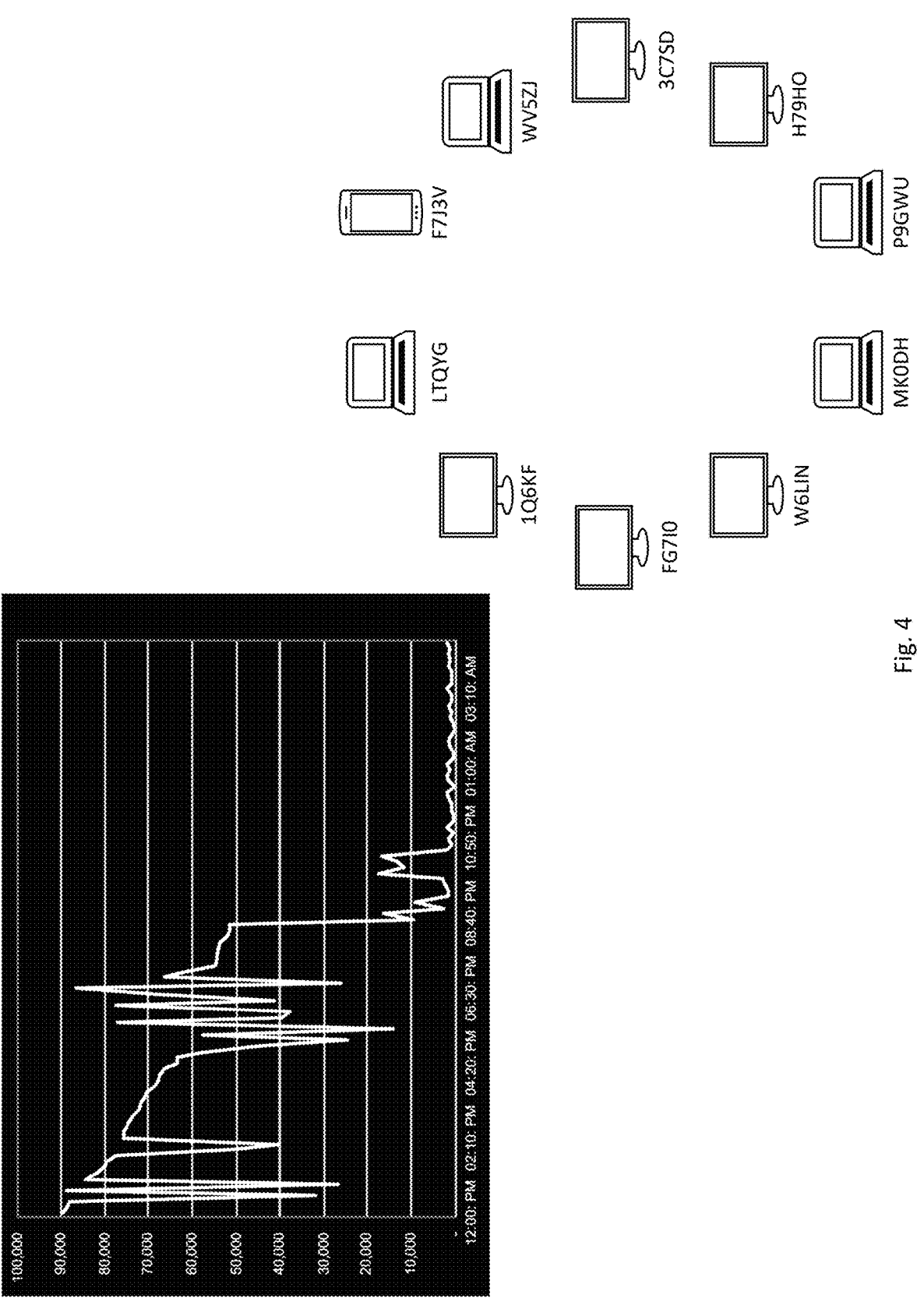
FIG. 4 illustrates a block diagram of an embodiment of a graphical user interface to display the endpoint agents connecting to that cyber security appliance, where the graphical user interface is scripted to visually highlight end-point computing-device with anomalies.

FIG. 4 illustrates a block diagram of an embodiment of a graphical user interface to display the endpoint agents connecting to that cyber security appliance, where the graphical user interface is scripted to visually highlight end-point computing-device with anomalies.

The cyber security appliance 200 receives collected pattern of life data from two or more endpoint agents 100. Each of the two or more endpoint agents 100 is on their own end-point computing-device in the network. The cyber security appliance 200 has a graphical user interface to display the endpoint agents 100 connecting to that cyber security appliance 200.

On the same user interface, a human analyst can call up network data and metrics on in a first window/page as well as see process specific information in a second window/ page, all within the same UI to allow a human user to make easier visual comparisons.

The graphical user interface shows all currently active devices along with a Search bar to search for particular end-point computing-devices, which will then be indicated. The graphical user interface also shows the Operating System of each end-point computing-device being monitored by that device's endpoint agent 100. The graphical user interface visually highlights end-point computing-devices with anomalies occurring compared to a normal pattern of life for that end-point computing-device.

The graphical user interface allows drill-downs into displayed end-point computing-devices and the information conveyed by its endpoint agent 100. When the drill down occurs, additional details about the selected device are shown on the right side of the screen. For example, if a user clicks on a specific icon, the display screen delivering more details on current and historic events for that device is drilled into and displayed. Also, the graphical user interface also shows relevant information when drilling-down into incidents on the host.

The graphical user interface also allows the user to pivot directly from every network connection that has data provided by a corresponding endpoint agent 100 between the network activities and the endpoint agent activities via hovering over a particular connection or clicking a hyperlink embedded in the visualized connection.

The graphical user interface, by hovering over a specific host, a popup window will display relevant information on that end-point computing-device.

The graphical user interface also visualizes process chains detected as having an anomalous process relationship or potentially indicative of a cyber threat. The graphical user interface also visualizes processes by displaying them with colored icons according to their cyber-threat risk score (high score=yellow/red). The cyber-threat risk score(s) alongside regular information, is available in a second region of the user interface. The cyber-threat risk scores of several different anomalies can be flexibly combined with different weighting algorithms for detections of potential cyber threats.

The graphical user interface may show a number of metrics, statistics and contextual data to assist an analyst or security professional investigating a threat. For example, the graphical user interface displays a list of the 'top 5' X for the given anomaly, e.g., the top 5 paths where this executable has been seen before (or for another metric, 'unusual parent', the top 5 parents commonly seen for this executable). This makes it easier for the analyst to see what 'constitutes normal'.

The graphical user interface also shows similar process chains and process relationships when a process flow is clicked on. Often, malware leverages certain chains of processes during an attack, e.g., Word.exe->cmd.exe->powershell.exe. This features allows the user to search for the same process chain, process sub-chain or similar process relationships by simply selecting the start and end process. Results are shown on the right, highlighting possibly related infections. This is very powerful for threat hunting.

The Basics of an Example Cyber Threat Defense System

Figure 7:
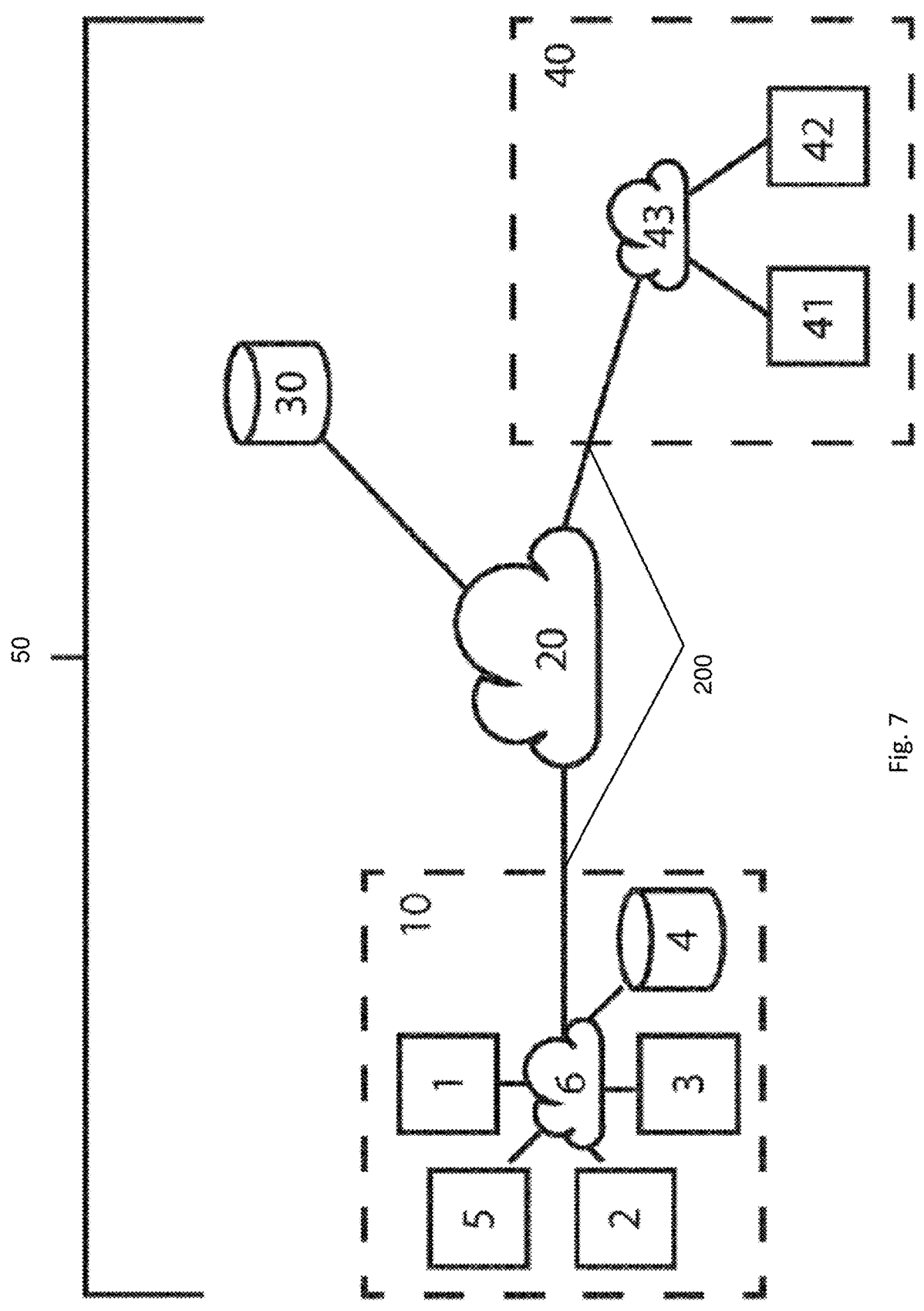
FIG. 7 illustrates an example cyber threat defense system, including the cyber security appliance and its endpoint agents, protecting an example network and its computing-devices.

FIG. 7 illustrates an example cyber threat defense system, including the cyber security appliance and its endpoint agents, protecting an example network and its computing-devices. The example network FIG. 7 illustrates a network of computer systems 50 using one or more cyber security appliances 200 and its connected endpoint agents 100. The system depicted by FIG. 7 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 7.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine-learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine-learning is at the forefront of the fight against automated and human-driven cyber-threats, overcoming the limitations of rules and signature-based approaches:

The machine-learning learns what is normal within a network—it does not depend upon knowledge of previous attacks.

The machine-learning thrives on the scale, complexity and diversity of modern businesses, where every device and person is slightly different.

The machine-learning turns the innovation of attackers against them—any unusual activity is visible.

The machine-learning constantly revisits assumptions about behavior, using probabilistic mathematics.

The machine-learning is always up to date and not reliant on human input. Utilizing machine-learning in cyber security technology is difficult, but when correctly implemented it is extremely powerful. The machine-learning means that previously unidentified threats can be detected, even when their manifestations fail to trigger any rule set or signature. Instead, machine-learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine-learning understanding is constantly being challenged and adapted, based on new information.

New unsupervised machine-learning therefore allows computers to recognize evolving threats, without prior warning or supervision.

Unsupervised Machine-Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine-learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine-learning on cyber security is transformative:

Threats from within, which would otherwise go undetected, can be spotted, highlighted, contextually prioritized and isolated using these algorithms.

The application of machine-learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, a closer look at the cyber threat defense system's machine-learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access; Data access; Timings of events; Credential use; DNS requests; and other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

Analyzes behavior in the context of other similar devices on the network;

Algorithms identify naturally occurring groupings of devices—impossible to do manually; and Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:

Raw network IP traffic captured from an IP or other network TAP or SPAN port;

Machine generated log files;

Building access ("swipe card") systems;

IP or non IP data flowing over an ICS distributed network;

Individual machine, peripheral or component power usage;

Telecommunication signal strength; and/or

Machine level performance data taken from on-host sources (CPU usage/memory usage/disk usage/disk free space/network usage/etc.).

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:

The number of bytes of data entering or leaving a networked device per time interval.

File access.

The commonality/rarity of a communications process

Invalid SSL certification.

Failed authorization attempt.

Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.

The number of internal link-local IP Broadcast requests originating from a networked device.

The size of the packet payload data.

The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc.

Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine-learning/AI to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a 3$^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-F), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. The functionality performed by one or modules may be combined into a single module, where logically possible, and a modules functionality may be split into multiple modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An endpoint agent configured to enable detection of a cyber threat on an end-point computing-device, comprising:
   a communications module configured to communicate with a cyber security appliance,
   a collections module configured to monitor and collect a pattern of life data of software processes executing on the end-point computing-device and one or more users of the end-point computing-device, and
   an autonomous response module;
   wherein the endpoint agent is configured to be resident on the end-point computing-device,
   wherein the communications module and the collections module cooperate to send the pattern of life data, via the communications module, to the cyber security appliance;
   wherein the cyber security appliance is configured to contain at least one or more machine-learning models to analyze the pattern of life data for two or more computing devices, where the end-point agent is configured to securely communicate with the cyber security appliance;
   wherein instructions implemented in software of the communications module, the collections module, and the autonomous response module are configured to be stored in an executable format in one or more memories and to be executed by one or more processors of the end-point computing-device,
   wherein the communications and collections modules in the endpoint agent and one or more memories and one or more processors in the end-point computing-device are part of the endpoint agent, and
   wherein the communications and collections modules are configured to cooperate with the machine-learning models in the cyber security appliance to collect a data indicative of a pattern of life for that end-point computing-device so that the machine-learning models can model the pattern of life to enable a detection of the cyber threat on that end-point computing-device, where an unsupervised first machine-learning model is configured to continuously model the pattern of life data for the endpoint device; and wherein when the endpoint agent is not connected to a network where the cyber security appliance is installed or when the cyber security appliance is unavailable, the communications module is configured to send collected pattern of life data to one or more memories of the end-point computing-device, and the autonomous response module is configured to autonomously cause one or more actions to be taken to contain a detected cyber threat.

2. The endpoint agent of claim 1, further comprising a cyber threat module that references one or more machine-learning models trained on potential cyber threats to analyze for potential cyber threats on the end-point computing-device based on the collected pattern of life data that deviates from a normal pattern of life for that end-point computing-device.

3. The endpoint agent of claim 1, wherein the communications module is further configured to send the collected pattern of life data to the cyber security appliance, and the cyber security appliance is configured to initially match a type of computing-device and operating system belonging to the end-point computing-device to apply and route the collected pattern of life data to a corresponding set of the one or more machine-learning models trained on that end-point computing-device.

4. The endpoint agent of claim 1, wherein the cyber security appliance is further configured with a second autonomous response module to cause one or more actions by the endpoint agent to contain the cyber threat when the cyber threat is detected, wherein the autonomous response module has a user programmable interface with any of i) fields, ii) menus, and iii) icons to allow a user to preauthorize the autonomous response module to take actions to contain the cyber threat, and wherein the autonomous response module is configured to cooperate with the communications module in the endpoint agent to cause the one or more actions to contain the detected cyber threat when a cyber-threat risk score, indicative of a likelihood of the cyber threat, is equal to or above an actionable threshold.

5. The endpoint agent of claim 1, wherein the collections module is configured to cooperate with at least one or more probes that include: i) a first probe configured to collect data about an operating system of the end-point computing-device as well as ii) a second probe configured to collect data about an individual process executing on the end-point computing-device, and iii) a third probe configured to monitor and record events occurring on the end-point computing-device and collaborate with system event logging tools, wherein the collected data regarding the operating system and individual processes along with the recorded events are sent in the collected pattern of life data by the collections module to the cyber security appliance.

6. The endpoint agent of claim 1, wherein the cyber security appliance is configured to receive collected pattern of life data from two or more endpoint agents, including the endpoint agent, each of the two or more endpoint agents is configured to be resident on their own end-point computing-device in the network, wherein the cyber security appliance has a graphical user interface to display the endpoint agents and their end-point computing-device connecting to that cyber security appliance, wherein the graphical user interface is configured to visually highlight end-point computing-devices with anomalies occurring compared to a normal pattern of life for that end-point computing-device.

7. The endpoint agent of claim 1, wherein the pattern of life data includes at least one of metadata, events, and alerts regarding at least i) the users, ii) the software processes, iii) relationships between the software processes, iv) device operation, v) operating system configuration changes, and vi) combinations of these, and the pattern of life data is sent by the communications module to the cyber security appliance installed in the network.

8. An endpoint agent configured to enable detection of a cyber threat on an end-point computing-device, comprising:

a communications module configured to communicate with a cyber security appliance, a collections module configured to monitor and collect a pattern of life data of software processes executing on the end-point computing-device and one or more users of the end-point computing-device, wherein the endpoint agent is configured to be resident on the end-point computing-device, wherein the communications module and the collections module cooperate to send the pattern of life data, via the communications module, to the cyber security appliance;

where the cyber security appliance is configured to contain at least one or more machine-learning models to analyze the pattern of life data for two or more computing-devices, where the end-point agent is configured to securely communicate with the cyber security appliance, wherein instructions implemented in software of the communications module, the collections module, and an autonomous response module are configured to be stored in an executable format in one or more memories and to be executed by one or more processors of the end-point computing-device, wherein the communications and collections modules in the endpoint agent and the one or more memories and one or more processors in the end-point computing-device are part of the endpoint agent, wherein the communications module is further configured to send collected pattern of life data to the cyber security appliance at periodic intervals when the end-point agent is connected to a network where the cyber security appliance is installed, wherein the communications module is further configured to send collected pattern of life data to the one or more memories of the end-point computing-device i) when not connected to the network where the cyber security appliance is installed as well as ii) when the cyber security appliance is unavailable; wherein in either situation, the collected pattern of life data is stored in the memories when possible; and where the autonomous response module is configured to cause one or more actions to contain the cyber threat when detected and when i) the endpoint agent is not connected to the network where the cyber security appliance is installed, when ii) the cyber security appliance is unavailable to communicate with the endpoint agent, and any combination of i) and ii), wherein the autonomous response module is located in the endpoint agent and uses a decision engine to take one or more actions preapproved by a user to autonomously attempt to contain a potential cyber threat when predefined conditions of suspicious behavior and/or anomaly level are met, and wherein the autonomous response module is configured to cooperate with the communications module in the endpoint agent to detect when i) the endpoint agent is not connected to the network where the cyber security appliance is installed, when ii) the cyber security appliance is unavailable to communicate with the endpoint agent, and any combination of i) and ii).

9. The endpoint agent of claim 8, wherein the pattern of life data includes at least one of metadata, events, and alerts regarding at least i) the users, ii) the software processes, iii) relationships between the software processes, iv) device operation, v) operating system configuration changes, and vi) combinations of these, and the pattern of life data is sent by the communications module to the cyber security appliance installed in the network.

10. A method for an endpoint agent configured to enable a detection of a cyber threat on an end-point computing-device, comprising:

configuring the endpoint agent to be resident on the end-point computing-device to communicate with a cyber security appliance;

configuring the endpoint agent to monitor and collect pattern of life data of software processes executing on the end-point computing-device and one or more users of the end-point computing-device;

configuring the endpoint agent to send the pattern of life data via a communications module to the cyber security appliance, configuring the endpoint agent to be installed on the end-point computing-device, configuring the cyber security appliance to contain at least one or more machine-learning models to analyze the pattern of life data for two or more endpoint computing-devices securely communicating to the cyber security appliance;

configuring the communications and collections modules in the endpoint agent to cooperate with the machine-learning models in cyber security appliance to collect a data indicative of a pattern of life for that end-point computing-device so that the machine-learning models can model the pattern of life to enable a detection of the cyber threat on that end-point computing-device; and configuring communication with existing third-party endpoint security processes on the endpoint computing-device by having a unifying translator to understand and exchange communications with the third-party endpoint security processes on the end-point computing-device, where the unifying translator is configured to map conveyed information from a plurality of different known third-party endpoint security processes with an application programming interface.

11. The method for an endpoint agent of claim 10, wherein the pattern of life data includes at least one of metadata, events, and alerts regarding at least i) one or more users of the end-point computing-device, ii) multiple software processes operating on the end-point computing-device, iii) relationships between the software processes, iv) device operation, v) operating system configuration changes, and vi) combinations of these, and then the collected the pattern of life data is sent to the cyber security appliance, wherein the cyber security appliance uses the one or more machine-learning models trained on the end-point computing-device to analyze the collected pattern of life data for the endpoint agent passed to the cyber security appliance against a normal pattern of life for the end-point computing-device.

12. The method for an endpoint agent of claim 10, further comprising using a cyber threat module that references one or more machine-learning models trained on potential cyber threats to analyze for potential cyber threats on the end-point computing-device in light of the collected pattern of life data that deviates from a normal pattern of life for that end-point computing-device to detect the cyber threat.

13. The method of claim 10, further comprising:

configuring an autonomous response module to cause one or more actions to contain a detected cyber threat when a cyber-threat risk score, indicative of a likelihood of a cyber-threat, is equal to or above an actionable threshold, wherein the cyber threat module is configured to generate the cyber-threat risk score based on an analysis of potential cyber threats on the end-point computing-device in light of the collected pattern of life data that deviates from a normal pattern of life for that end-point computing-device.

14. The method of claim 10, further comprising:

configuring the endpoint agent to send collected pattern of life data to the cyber security appliance, and further configuring the cyber security appliance to initially match a type of computing-device and operating system belonging to the end-point computing-device to apply and route the collected pattern of life data to a corresponding set of the one or more machine-learning models trained on the end-point computing-device.

15. The method of claim 10, further comprising:

configuring the endpoint agent to send collected pattern of life data to the cyber security appliance at periodic intervals when the endpoint agent is connected to a network where the cyber security appliance is installed; and configuring the endpoint agent to send collected pattern of life data to one or more memories of the end-point computing-device when i) the end-point computing-device is not connected to the network where the cyber security appliance is installed as well as when ii) the cyber security appliance is unavailable; wherein in either situation, the collected pattern of life data is stored in the memories when possible.

16. The method of claim 10, further comprising:

configuring an autonomous response module to cause one or more actions to contain the cyber threat when a potential cyber threat is detected and when i) the endpoint agent is not connected to a network where the cyber security appliance is installed, when ii) the cyber security appliance is unavailable to communicate with the endpoint agent, and any combination of i) and ii), wherein the autonomous response module is configured to be located in the endpoint agent and uses a decision engine to take one or more actions preapproved by a user to autonomously attempt to contain the potential cyber threat when predefined conditions of suspicious behavior and/or anomaly level are met.

17. The method of claim 10, further comprising:

configuring an autonomous response module on the cyber security appliance to cause one or more actions by the endpoint agent to contain the cyber threat when detected, wherein the autonomous response module has a user programmable interface with any of i) fields, ii) menus, and iii) icons to allow a user to preauthorize the autonomous response module to take actions to contain the cyber threat.

18. The method of claim 10, further comprising:

configuring the collections module to cooperate with one or more probes that include at least: i) a first probe configured to collect data about an operating system of the end-point computing-device as well as ii) a second probe configured to collect data about an individual process executing on the end-point computing-device, and iii) a third probe to monitor and record events occurring on the end-point computing-device and collaborate with system event logging tool, wherein the collected data regarding the operating system and individual processes along with the recorded events are sent in the collected pattern of life data by the collections module to the cyber security appliance.

19. A non-transitory computer readable medium comprising computer readable code operable that when executed by one or more processing apparatuses in the cyber security appliance, instruct a computing-device to perform the method of claim 10.

\* \* \* \* \*